United States Patent

Rigney

(10) Patent No.: US 7,990,646 B2
(45) Date of Patent: Aug. 2, 2011

(54) DATA PATTERN DETECTION USING ADAPTIVE SEARCH WINDOWS

(75) Inventor: Brian Rigney, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/540,873

(22) Filed: Sep. 29, 2006

(65) Prior Publication Data

US 2007/0076314 A1    Apr. 5, 2007

Related U.S. Application Data

(60) Provisional application No. 60/722,829, filed on Sep. 30, 2005.

(51) Int. Cl.
*G11B 5/09*     (2006.01)
*G11B 21/02*    (2006.01)

(52) U.S. Cl. .......................... 360/51; 360/75
(58) Field of Classification Search .................... None
See application file for complete search history.

(56) References Cited

U.S. PATENT DOCUMENTS

| | | | | |
|---|---|---|---|---|
| 4,809,088 | A * | 2/1989 | Lofgren et al. | 360/31 |
| 5,289,498 | A * | 2/1994 | Hurlbut et al. | 375/142 |
| 5,315,456 | A * | 5/1994 | Hessing et al. | 360/77.08 |
| 5,402,273 | A * | 3/1995 | Tucker | 360/51 |
| 5,559,645 | A * | 9/1996 | Miyazawa et al. | 360/51 |
| 5,946,153 | A | 8/1999 | Emo et al. | |
| 6,005,725 | A | 12/1999 | Emo et al. | |
| 6,031,672 | A | 2/2000 | Bergquist et al. | |
| 6,603,622 | B1 | 8/2003 | Christiansen et al. | |
| 6,738,205 | B1 * | 5/2004 | Moran et al. | 360/17 |
| 6,882,487 | B2 * | 4/2005 | Hanson et al. | 360/51 |
| 6,940,683 | B2 | 9/2005 | Berman et al. | |
| 6,950,956 | B2 * | 9/2005 | Zerbe et al. | 713/400 |
| 7,019,937 | B1 | 3/2006 | Liikanen et al. | |
| 7,068,459 | B1 * | 6/2006 | Cloke et al. | 360/75 |
| 7,158,336 | B2 * | 1/2007 | Chan et al. | 360/77.05 |
| 7,206,149 | B2 * | 4/2007 | Ozdemir | 360/51 |
| 7,230,786 | B1 * | 6/2007 | Ray et al. | 360/75 |
| 7,301,717 | B1 * | 11/2007 | Lee et al. | 360/51 |
| 7,551,387 | B2 * | 6/2009 | Sun et al. | 360/75 |

* cited by examiner

*Primary Examiner* — K. Wong
(74) *Attorney, Agent, or Firm* — Fellers, Snider, et al.

(57) ABSTRACT

Method and apparatus for detecting a reference pattern in a transmitted bit sequence. A duration of a search window used to detect the reference pattern is adaptively adjusted in relation to a previous detection of the pattern. This is preferably carried out by using a first search window to initially detect the pattern, and then adjusting the first search window to provide a second search window to subsequently detect the pattern. Preferably, the search window is an elapsed period of time during which a transducer is swept adjacent a storage medium to detect the reference pattern. Servo data are preferably written as a sequence of adjacent spiral servo patterns, and the reference pattern is preferably detected each time to determine the relative location of the most recently written spiral. Preferably, a larger search window is used for initial spirals and a smaller search window is used for subsequently written spirals.

21 Claims, 5 Drawing Sheets

DATA PATTERN DETECTION USING ADAPTIVE SEARCH WINDOWS

RELATED APPLICATIONS

The present application makes a claim of domestic priority to U.S. Provisional Patent Application No. 60/722,829 filed Sep. 30, 2005.

FIELD OF THE INVENTION

The claimed invention relates generally to the field of data transmission systems and more particularly, but not by way of limitation, to adaptively adjusting a search window size used to detect data patterns in a bit stream.

BACKGROUND

The ongoing commercialization of data processing devices has generally resulted in successive generations of devices having ever higher rates of functionality and interconnectivity. To this end, mass storage capabilities are being increasingly incorporated into a number of different types of devices, particularly with hand-held portable devices such as cell phones, digital cameras, personal data assistants (PDAs), etc.

A disc drive is one type of data storage device that generally stores data on one or more rotatable magnetic recording media. A corresponding array of data transducers (heads) are selectively moved across the surfaces of the media to transduce data therewith. Servo data patterns are often provided on the media to enable a transducer to be correctly positioned to carry out a data I/O operation.

With the continued demand for data processing devices with ever higher levels of performance, there remains a continual need for improvements in the manner in which data patterns are detected in a transmitted data sequence.

SUMMARY OF THE INVENTION

Preferred embodiments of the present invention are generally directed to an apparatus and method for detecting a reference pattern in a transmitted bit sequence.

In accordance with preferred embodiments, a duration of a search window used to detect the reference pattern is adaptively adjusted in relation to a previous detection of the pattern. This is preferably carried out by using a first search window to initially detect the pattern, and then adjusting the first search window to provide a second search window to subsequently detect the pattern. The search window is preferably characterized as an elapsed period of time during which a transducer is swept adjacent a storage medium to detect the reference pattern.

In a preferred embodiment, servo data are written to the medium as a sequence of adjacent spiral servo patterns. The reference pattern is preferably arranged as a circumferentially extending bit sequence of selected frequency that is detected at the conclusion of the writing of each spiral. This allows a determination to be made of the relative location of each most recently written pattern in turn. Preferably, a larger search window is used for initially written servo patterns, and a smaller search window is used for subsequently written servo patterns.

These and various other features and advantages of preferred embodiments of the present invention will be apparent upon reading the following detailed description and upon review of the associated drawings.

DETAILED DESCRIPTION

Figure 1:
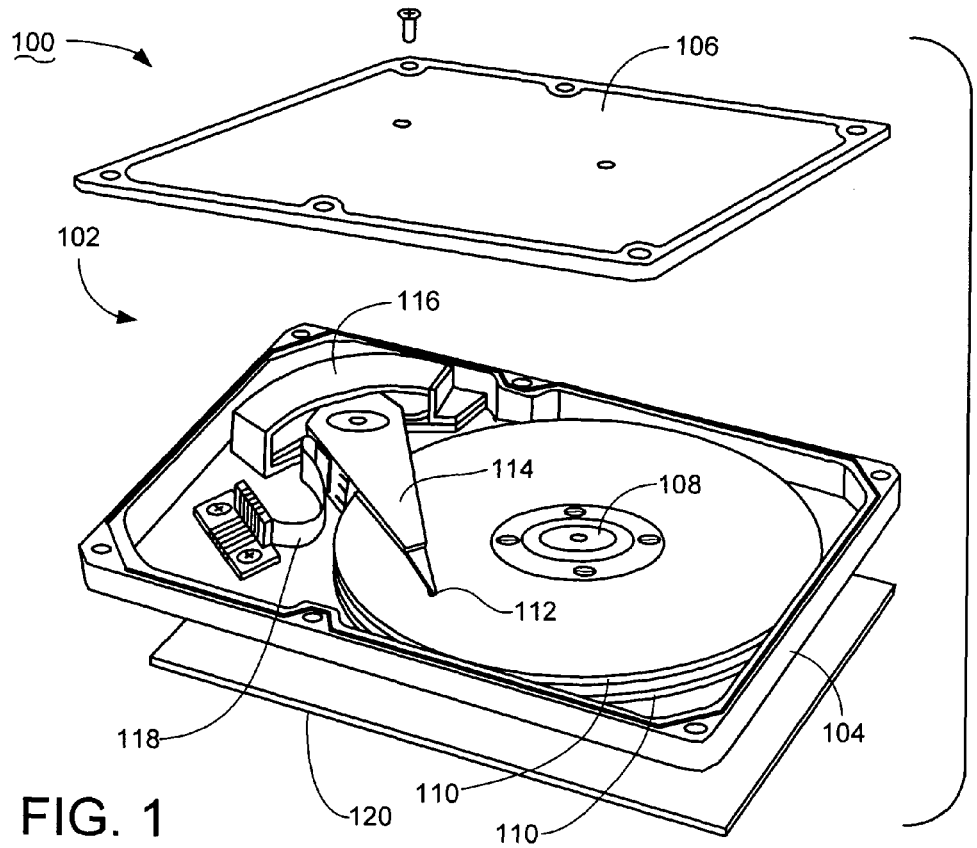
FIG. 1 is an exploded isometric view of an exemplary data storage device in which preferred embodiments of the present invention can be advantageously practiced.

FIG. 1 provides a top plan view of a data storage device 100. The device 100 is provided to show an exemplary environment in which preferred embodiments of the present invention can be advantageously practiced. It will be understood, however, that the claimed invention is not so limited.

The device 100 includes a substantially sealed housing 102 formed from a base deck 104 and top cover 106. An internally disposed spindle motor 108 is configured to rotate a number of storage media 110. The media 110 are accessed by a corresponding array of data transducers 112 supported by an actuator 114. Application of current to a voice coil motor (VCM) 116 induces rotary movement of the actuator 114, thereby aligning the transducers 112 with tracks (not shown) defined on the media surfaces.

A flex circuit assembly 118 establishes electrical communication paths between the actuator 114 and device control electronics on an externally disposed printed circuit board (PCB) 120. The control electronics include read/write channel circuitry to facilitate the writing of data to and the reading of data from the tracks, as well as servo control circuitry which uses servo patterns (not shown) provided on the media 110 to position the transducers 112 with respect to the tracks.

Figure 2:
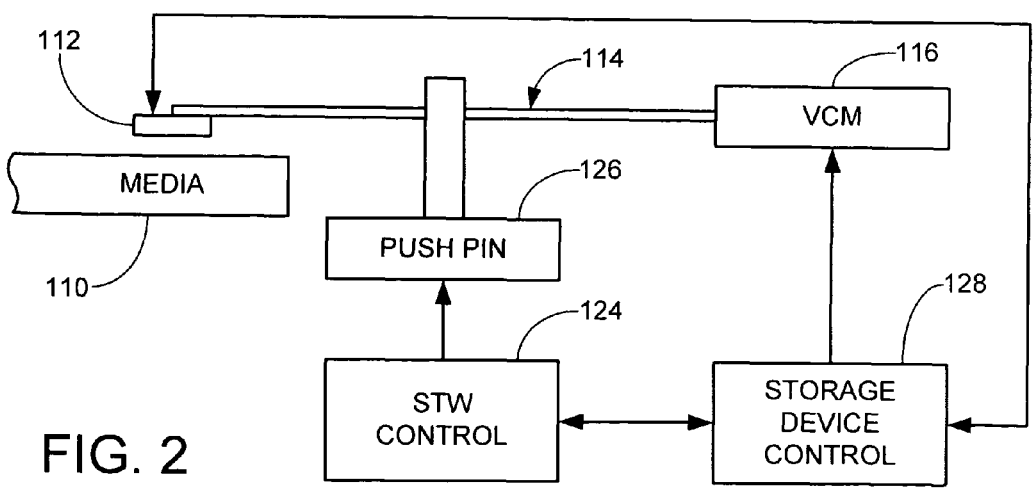
FIG. 2 provides a functional representation of a preferred manner in which servo data are provided to the media of the device of FIG. 1.

FIG. 2 shows a system 122 preferably used to write servo data patterns to the media 110 of FIG. 1. The system 122 includes a servo track writer (STW) control assembly 124 which controllably advances the actuator 114 via a push pin assembly 126. The push pin assembly 126 preferably mechanically engages the actuator 114 through an access aperture in the base deck 102 (not shown).

The STW control assembly 124 preferably utilizes closed loop positional control through feedback provided by a suitable feedback sensor (not shown), such as a laser inferometer. This allows the STW control assembly 124 to precisely advance a selected transducer 112 across the corresponding media surface during the writing of the servo data.

A storage device control assembly 128 preferably provides control electronics for the device 100 to enable the transducer to write patterns to and read patterns from the media 110. As desired, the storage device control assembly 128 further preferably interfaces with the VCM 116 to provide actuation of the actuator 114 in conjunction with, or in lieu of, the operation of the push pin assembly 126.

It will be appreciated at this point that while FIG. 2 generally embodies an STW environment, such is not limiting; for example, the various preferred embodiments can readily be incorporated in other servo writing environments such as a self-servo write operation. Moreover, it should be clear that preferred embodiments disclosed herein are not necessarily limited to detecting servo data, or even data stored on a medium at all.

Figure 3:
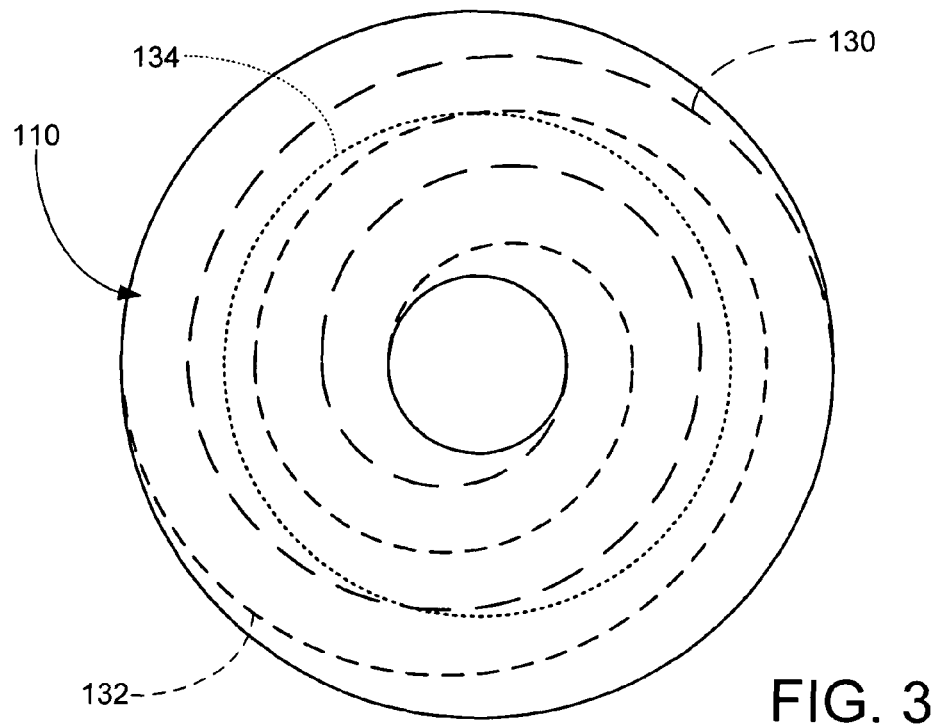
FIG. 3 shows exemplary types of servo data patterns written to the media of the device of FIG. 1.

FIG. 3 shows a preferred arrangement of servo data patterns provided to the media 110 of FIGS. 1 and 2. Spiral servo patterns 130, 132 extend radially in a substantially helix form across the media 110 from an outermost diameter (OD) to an innermost diameter (ID) of the associated recording surface. The patterns 130, 132 preferably provide positional data that continuously extend across the radial surface.

While only two exemplary patterns 130, 132 are shown, preferably a larger population of such patterns (e.g., 200-400 spirals) are provided in a substantially uniformly spaced apart relation about the medium. This population of patterns is preferably written to the media surfaces by the system 122 of FIG. 2. The rates at which the spirals 130, 132 advance across the media surface will be a function of a number of factors, including the rotational velocity of the media 110 and the radial velocity of the transducer 112.

The spiral patterns 130, 132 are preferably used to generate adjacent concentric servo data tracks on the media, one of which is represented at 134. The servo data of the data tracks 134 are preferably arrayed as a series of spaced apart, embedded servo wedges that extend radially across the surfaces of the media 110. Each servo wedge preferably includes synchronization, automatic gain control (AGC), header, track address (e.g., Grey code), and intra-track positional information (e.g., A, B, C, D dibit patterns). Preferably, the number of embedded servo wedges is selected to match the number of spirals 130, 132.

The concentric servo data tracks 134 are preferably written during a self-servo write operation of the device 100 after the device has been disengaged from the system 122. The spirals 130, 132 are used to control the placement of the servo data tracks 134 onto the media 110, and are preferably overwritten by the servo data tracks 134 during this process. Once the concentric servo data tracks 134 have been written, user data sectors are preferably formatted along data tracks in the regions between adjacent servo wedges to store user data during normal device operation.

Figure 4:
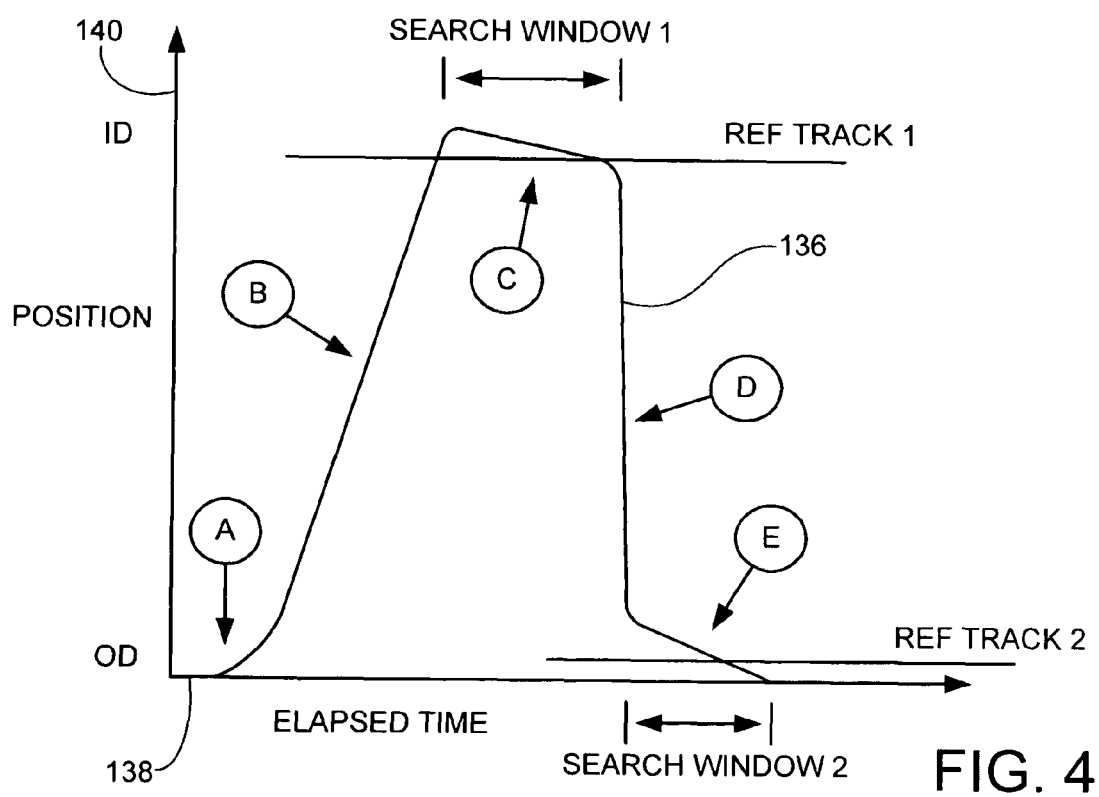
FIG. 4 sets forth an exemplary seek profile carried out by the system of FIG. 2.

FIG. 4 provides a spiral seek trajectory curve 136 preferably carried out to write each of the spirals 130, 132 of FIG. 3. The curve 136 is plotted against an elapsed time x-axis 138 and a radial position y-axis 140. Preferably, during each cycle the STW control assembly 124 operates to initially position the transducer 112 adjacent the OD of the associated medium 110. This is shown at initial point "A" of the curve 136.

The STW control assembly 124 accelerates the transducer 112 to a desired velocity and a write gate (WG) signal is asserted via the storage device control assembly 128 to enable the transducer 112 to write the spiral servo pattern. This operation is represented by segment "B" of curve 136 and continues until the transducer 112 reaches the ID of the medium 110, at which point the spiral is completed and the WG signal is disabled.

Next, the STW control assembly 124 initiates a relatively slow seek toward the OD, as indicated by segment "C" in curve 136. During this seek, a search window is activated to locate a reference pattern (e.g., reference track 1 shown in FIG. 4). A read gate (RG) signal is preferably asserted by the storage device control assembly 128 and the transducer 112 slowly sweeps across the rotating medium 110 in an attempt to detect the reference track.

In a preferred embodiment, the reference pattern is a circumferentially extending ring with a constant low frequency pattern, such as a 2T pattern. However, the reference pattern can comprise any useful detection pattern including one that provides embedded header-type sector addressing. The reference pattern can also be one (or more) of the previously written spirals.

It will be noted that once the reference track is located, the coordinates of the OD end of the spiral 130, 132 previously written during the most recent pass (i.e., during segment "B") can be readily determined in relation to the angular and radial distance traveled by the transducer 112 since the completion of the spiral write operation.

Upon detection of the reference pattern, the STW control assembly 124 initiates a relatively high speed seek toward the OD, as indicated by segment "D" in curve 136, and then performs a second search for a second reference pattern adjacent the ID (segment "E" in curve 136). This search is preferably carried out over a search window during which the RG is asserted to detect a second reference track, and the second reference track (ref track 2) preferably comprises a circumferentially extending constant low frequency pattern, as before.

Upon detection of the second reference pattern, the coordinates of the ID end of the spiral previously written during segment "B" can be readily determined. With knowledge of the starting and end points of the most recently written data spiral, the system 122 can be configured to write the next adjacent spiral to the medium 110, and adjustments can be made as necessary to ensure the set of spirals are written within acceptable tolerances.

Preferably, the search windows (or "search zones") can be alternatively expressed in a number of forms, such as in terms of an elapsed time or a radial distance covered. For example, in FIG. 4 a given search window can be viewed as a selected duration of elapsed time during which the transducer 112 is moved radially toward the ID at a selected radial velocity to detect the reference pattern. Alternatively, the search window can be viewed as a radial distance (e.g., 1000 "tracks" of width across the medium 110) that the transducer 112 covers during movement at a selected velocity, which will correlate to an associated elaspsed time (i.e., $d = at^2 + vt + t_0$).

In other embodiments, the search window duration may be expressed solely as a single factor, such as time without an associated distance component. For example, the pattern may be detected from a bit stream over a given search window in an environment that does not involve the movement of a transducer, such as in a communications network setting.

Figure 5:
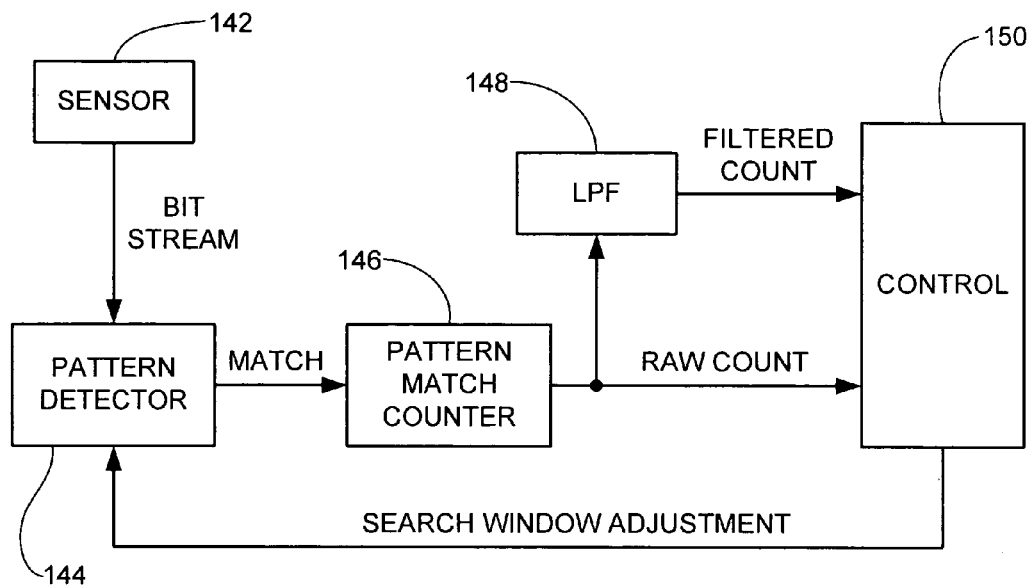
FIG. 5 is a generalized functional representation of portions of the system of FIG. 2.

FIG. 5 provides a functional block representation of portions of the STW control assembly 124 preferably used during the foregoing operations. The various components of FIG. 5 can be implemented including in hardware and/or in the form of programming steps executed by a programmable processor.

A sensor block 142 provides an initially transmitted bit stream to a pattern detector block 144. The detector block 144 is preferably characterized as a matched filter and operates to examine the input bit stream to detect the reference pattern at the associated reference frequency. When the pattern detector block 144 captures a selected portion of the reference pattern at the reference frequency over a sliding interval, the block 144 outputs a match count to increment a pattern match counter 146.

The incremented counts of the counter 146 are filtered by a low pass filter (LPF) 148, and both the raw counts and the filtered counts are provided to a control block 150 as shown. As explained below, the control block 150 operates to detect the reference track as well as to adaptively adjust the durations of the respective first and second search windows.

Figure 6:
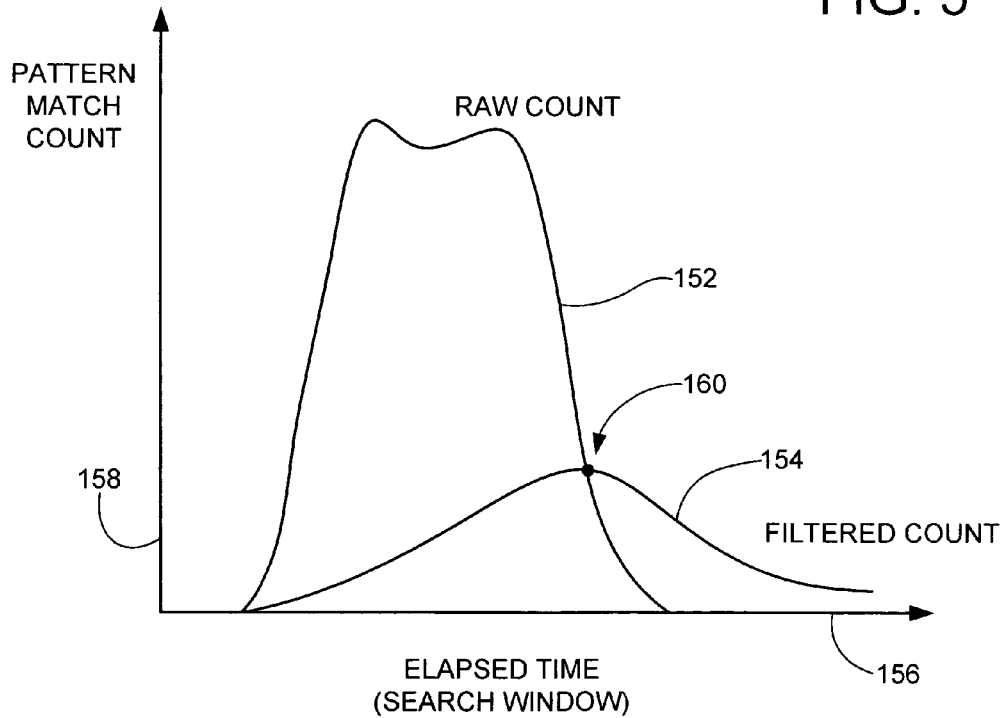
FIG. 6 is a graphical representation of exemplary detected pattern counts obtained during a search window established by the system of FIG. 2.

FIG. 6 provides a raw pattern detect count curve 152 and a filtered pattern detect count curve 154, each respectively plotted against an elapsed time x-axis 156 and y-axis 158. The curves 152, 154 represent exemplary data supplied to the control block 150 in FIG. 5 during a given search window.

The raw count curve 152 rapidly increases and decreases as the transducer 112 sweeps across the radial width of the reference pattern, whereas the filtered count curve 154 provides a smoother function with a maximum at point 160. Preferably, the control block 150 uses the maximum value at point 160 to identify the location of the reference track. It will be noted that this point is offset somewhat from the radial centerline of the reference track; however, this is not generally viewed as a problem in the present case, as the maximum value from the filtered count provides sufficient repeatability to serve as a suitable reference to determine the location of the OD of the most recently written spiral. Of course, more complex processing can be applied for applications requiring greater levels of precision.

Referring again to FIG. 4, it can be seen that the first and second search windows make up a significant portion of the entire cycle time used to write a given spiral 130, 132. Since multiple spirals are written to each media surface by the system 122, a reduction in the duration of the search windows would generally reduce the overall time required to process the device 100, and thus improve process throughput in a high volume manufacturing environment.

Merely shortening the search windows across the board, however, may introduce significant errors during the STW write process, and may even increase the overall production cycle times. A shortened search window would generally tend to result in fewer matches from the pattern detector 144. This could potentially introduce errors in the detected reference track location, leading to subsequent spirals not being located correctly on the medium. Also, a shortened search window may result in the inability of the control block 150 to detect the pattern at all, requiring the system 122 to restart the search sequence.

There are also a number of factors that can affect the ability to detect the reference pattern for a given window duration. Such factors include noise, push pin compression, thermal expansion of the actuator, thermal stability of the read channel electronics, etc. In some cases a longer search window duration may be needed in order to reliably detect the reference pattern, whereas in other cases adequate performance can be obtained using a substantially shorter search window.

Accordingly, the control block 150 is preferably configured to adaptively adjust the duration of the search windows used to detect the respective reference data patterns. This is preferably carried out in accordance with the flow of FIG. 7, which sets forth a SEARCH WINDOW ADAPTATION routine 200. It will be understood that while the routine 200 is described with reference to the exemplary environment of the system 122, such is not limiting.

A reference pattern is first provided at step 202. The reference pattern is preferably expressed as a bit sequence at a selected frequency and stored to a selected radial location of a rotatable medium, such as the aforementioned first and second reference tracks depicted in FIG. 4. However, in alternative embodiments the reference pattern can be provided in another form such as a transmitted sequence across a communication network.

An initial search window size is next selected at step 204. The search window size is preferably selected to be of sufficient duration to enable detection of the reference pattern of step 202. In the embodiment of FIG. 4, the initial search window size is preferably correlated to the respective ID to OD seeks at segments "C" or "E" of curve 136. As noted above, however, the search window can be established independently of, and not involve, a seek of a transducer.

Data are next preferably transmitted at step 206. While not required, this step is exemplified by the writing of servo data during segment "B" of curve 136.

The reference pattern of step 202 is next preferably detected at step 208 during the duration of the initial search window established during step 204. Preferably, this is carried out by the circuitry of FIG. 5 in accordance with the match counts illustrated in FIG. 6, although other detection methodologies can be applied as desired. Preferably, the location of the previously written data of step 204 is also determined during step 208 in relation to the detected reference pattern.

Figure 7:
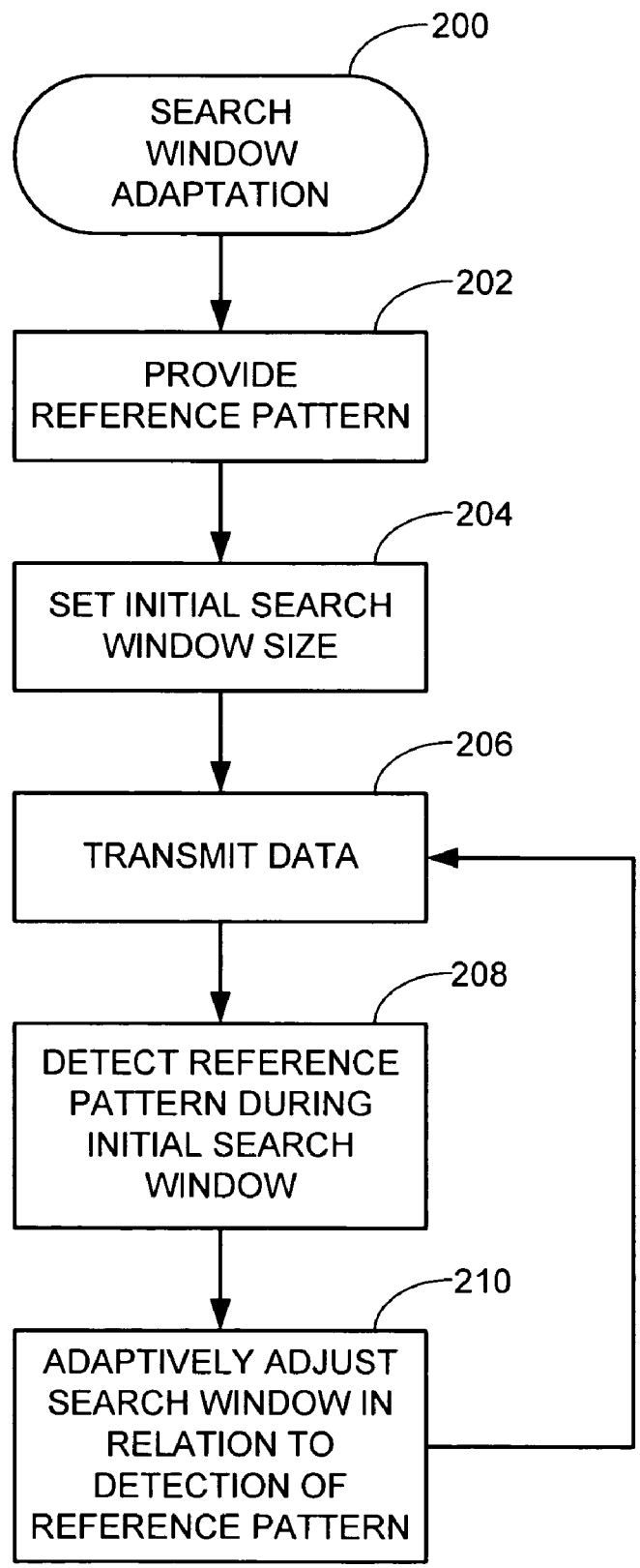
FIG. 7 is a flow chart for a SEARCH WINDOW ADAPTATION routine, illustrative of steps carried out in accordance with preferred embodiments of the present invention.

Once the reference pattern has been detected, the search window is adaptively adjusted at step 210 in relation to the detection carried out during step 208. As shown by FIG. 7, subsequent detections are preferably carried out using the newly obtained search window characteristics, and this adaptation is preferably carried out in a continuous manner.

While any number of different approaches can be utilized, preferred manners in which the search window is adaptively adjusted during step 210 will now be discussed. In a first embodiment, a priori knowledge of typical system characteristics can be used to establish different search window durations at different points in the process.

Figure 8:
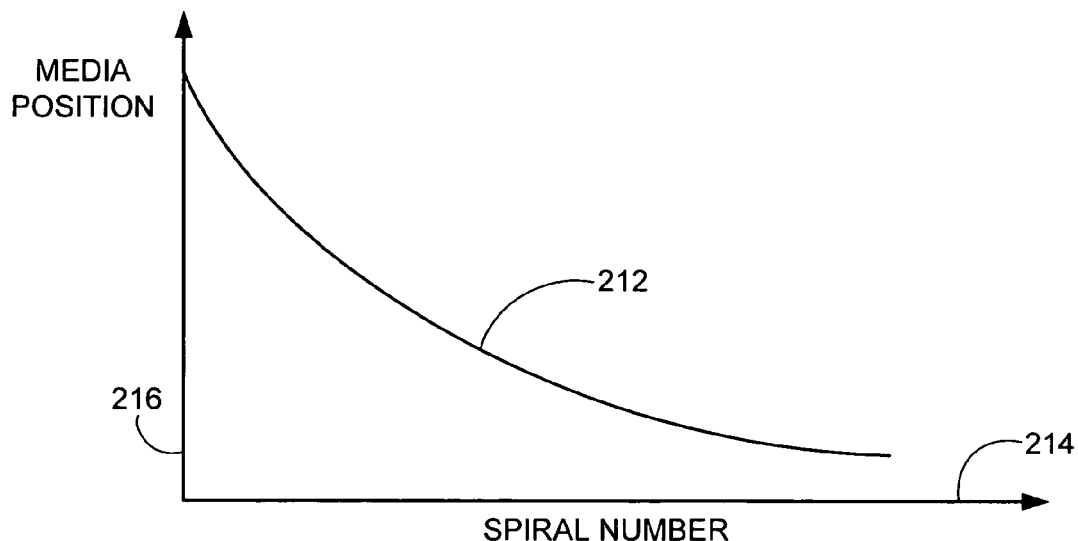
FIG. 8 graphically illustrates a generalized reference trajectory curve for a population of spiral servo patterns such as represented in FIG. 2.

FIG. 8 shows a reference trajectory curve 212 for a population of spirals on a selected medium 110. The curve 212 is plotted against a spiral number x-axis 216 and a media position y-axis 218, and generally represents the rate of change of position for adjacent spirals about the medium (such as at the OD). More specifically, the curve 212 generally provides a measure of the drift of the transducer relative to the reference pattern as the transducer repetitively moves over the reference pattern in the course of writing the population of spiral servo patterns.

As can be seen from FIG. 8, reference track trajectories can change rapidly over the first few spiral seeks before settling into more gradual and well defined motion as more of the spirals are written. Using this knowledge, a sequence of search zone sizes can be adaptively selected for the writing of the population of spirals.

Preferably, a first number of the spirals written to the medium 110 are provided with a first search window size, and then a significantly reduced search window size is used for to the remaining spirals. For example, a first search window size of around 1500 tracks (in terms of radial width across the medium) may be used for the first 20 spirals, and then a second search window size of about 100 tracks can be used for the rest.

More sophisticated approaches can involve the use of three or more window sizes, and/or the use of a lookup table that transitions to different sizes in relation to a measured characteristic or parameter.

While operable, a downside to this approach generally relates to the inability to grow the search window range when pattern detection problems or non-smooth trajectories are experienced.

Another preferred approach to adaptively adjusting the search window size relates to pattern detection quality. Generally, when the reference track pattern matches from the detector 144 are relatively low, the reference track trajectories (e.g., 212, 214 in FIG. 8) can tend to become increasingly noisy. Low pattern match counts can arise from a number of factors, including weak or noisy heads, media defects, electronics offsets, etc.

Thus, a search window duration can be established that adjusts the search window in relation to the match count. This can be carried out, for example, in accordance with the following relationship:

$$S = C_1 + MC_2 \quad (1)$$

where S is the search window duration, $C_1$ is a baseline duration, M is a match count value, and $C_2$ is a gain factor. The match count value can be a peak value (e.g., the maximum value for curve 152 in FIG. 6) a total accumulated value (e.g., the area under curve 152), etc.

In a preferred approach, $C_1$ is a minimum duration for a search window, and $C_2$ is generally configured to increase the value of S as the value of M decreases. In an alternative preferred approach, $C_1$ is the most recently used search window duration, and this value is adjusted up or down for the next cycle in relation to the most recently obtained match count value M. A threshold can also be applied to the match count value M so that the current window size is only adjusted if the match count value deviates significantly from a baseline value.

Another preferred way to carry out the adaptation of step 210 in FIG. 7 is to adjust the seek velocity in relation to pattern detection quality. For example, if pattern detection quality is low, the radial velocity of the transducer 112 can be reduced, which will generally tend to increase the total number of pattern matches obtained by the pattern detector 144 since the transducer 112 will spend more dwell time over the pattern.

Similarly, if more than enough pattern matches are being obtained to reliably determine the reference point, the seek velocity can be increased. This will reduce overall elapsed time for the search window, albeit with a corresponding reduction in the overall number of pattern matches. An advantage of this approach is that the adaptation will generally tend to drive the system 122 to obtain the same nominal amount of pattern matches for all spirals.

Figure 9:
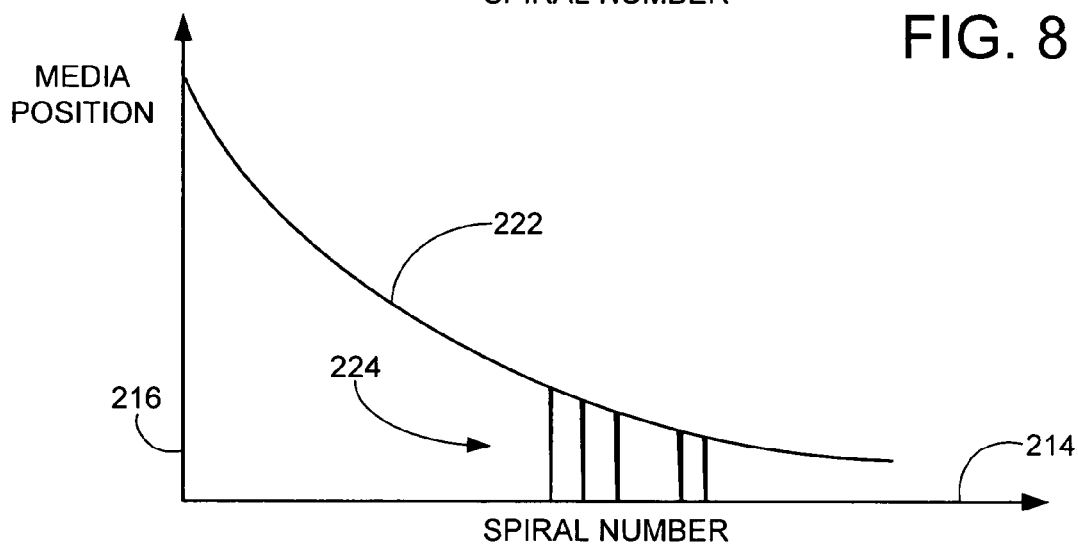
FIG. 9 provides a graphical representation of an alternative track trajectory curve with a number of reference track dropouts.

In another embodiment, reference track trajectory quality is utilized as a factor in adapting the search window. FIG. 9 shows an alternative track trajectory curve 222. Unlike the smooth curve 212 of FIG. 8, the curve 222 of FIG. 9 exhibits a number of reference track dropouts 224. When such dropouts occur, relatively large search zones will generally be required to adequately recover and produce spiral patterns without significant position errors.

It follows that search window size can be derived from a measure of the reference trajectory smoothness (continuity). A preferred approach uses the error between the previously measured reference track position and a least squares prediction of this location. The search window size can be determined from the following relationship:

$$S_i = C_1 + C_2(P_{i-1} - P_{LS\, i-1}) \quad (2)$$

where Si is the search window for spiral index i, Pi-1 is the reference track position for spiral index i-1, PLS is the predicted position at index i-1, and C1, C2 are constants. As the difference between the predicted and actual position increases, such as in response to a selected noise spike dropout 224 from FIG. 9, the search zone will also significantly increase from a base level. When the trajectory performance returns to normal, the search zone size will also return to the base level.

Figure 10:
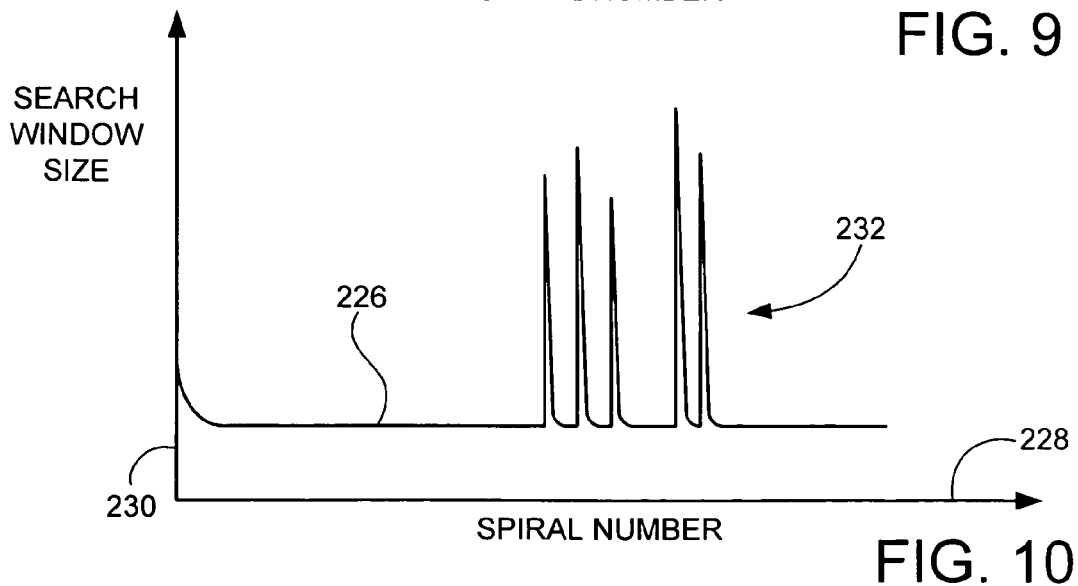
FIG. 10 graphically illustrates exemplary search window durations for the spiral servo patterns of FIG. 9.

This is graphically illustrated in FIG. 10, which provides a search window size curve 226 plotted against a spiral number x-axis 228 and a search window duration y-axis 230. After a relatively larger initial search window duration is applied, the curve 226 settles down to a nominal base level.

However, upon encountering each of the dropouts 224 in curve 222 of FIG. 9, the search window significantly increases, as shown by localized peaks 232 in FIG. 10. Once the spirals associated with the dropouts 224 have passed, the search window size quickly returns to the base level. This approach advantageously provides localized fast adaptation response while still providing an optimized base level duration.

The various preferred approaches discussed above can be utilized singularly or in tandem; for example, the dropout adaptation of FIGS. 9 and 10 can be used in combination with the multilevel approach of FIG. 8. It has been found that adapting the search window duration as set forth herein has provided significant reductions in production cycle time as compared to the use of static sized search window durations for all spirals.

In one case, it was found that the search window size for initial spirals could be increased in size by 150% from the previously used static size, and yet overall cycle time was reduced by an average of more than 60% on a per-device basis. This generally resulted in a more than doubling of the STW throughput, while providing increased production yields since the larger initial window sizes better accommodated the larger amounts of reference track drift at the beginning of the process.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising detecting multiple bits of a reference pattern using a single occurrence of an extended search window, and adjusting an overall duration of the window responsive to an accumulated match count obtained during said detection.

2. The method of claim 1, further comprising detecting multiple bits of a subsequently transmitted reference pattern using said single extended search window with said adjusted overall duration.

3. The method of claim 1, wherein the overall duration of the window is adjusted in inverse relation to the accumulated match count.

4. The method of claim 1, wherein the overall duration of the search window comprises an elapsed period of time during which a transducer is swept adjacent a storage medium to detect the reference pattern stored thereon.

5. The method of claim 4, wherein the transducer is swept across multiple track widths toward only a selected one of an innermost diameter (ID) or an outermost diameter (OD) of the storage medium over said search window duration.

6. The method of claim 1, further comprising a prior step of writing a circumferentially extending track to a storage medium comprising said reference pattern as a sequence of bits at a selected frequency, wherein the search window is used to determine a relative location of said track on the storage medium.

7. The method of claim 1, in which the accumulated match count is generated by a pattern detector responsive to said detected bits.

8. The method of claim 1, in which the overall duration of the search window is adjusted to maintain the match count at a nominally constant value.

9. A method comprising steps of detecting multiple successive bits in a transmitted reference pattern during an overall duration of a single occurrence of a first search window, adjusting the first search window to form a second search window having a second overall duration responsive to an accumulated number of match counts obtained during the detecting step, and detecting multiple successive bits in a subsequent transmission of said reference pattern during the second overall duration of a single occurrence of the second search window.

10. The method of claim 9, further comprising steps of writing first data to a storage medium, and identifying a location of the first data in relation to the detection of the reference pattern using the first search window.

11. The method of claim 10, further comprising steps of writing second data to the storage medium, and identifying a location of the second data in relation to detection of the reference pattern using the second search window.

12. The method of claim 11, wherein the first data comprise a first set of spiral servo patterns written to the storage medium, and wherein the second data comprise a second set of spiral servo patterns written to the storage medium.

13. The method of claim 9, wherein the detecting step comprises sweeping a transducer adjacent a storage medium to detect the reference pattern as a plurality of successive bits of selected frequency as the transducer crosses a track to which the reference pattern is written, accumulating said match count as a total count of the bits detected during the sweeping step, and filtering the accumulated count.

14. The method of claim 13, wherein the adaptively adjusting step comprises selecting the second duration of the second search window in relation to said accumulated match count.

15. An apparatus comprising a control block configured to adjust a duration of a search window used to detect a plurality of successive bits of a reference pattern in a transmitted bit sequence in relation to a previous detection of said pattern, said detection taking place over a single occurrence of said window.

16. The apparatus of claim 15, wherein the duration of the search window adjusted by the control block comprises an elapsed period of time during which a transducer is swept adjacent a storage medium to detect the reference pattern stored thereon.

17. The apparatus of claim 15, wherein the control block forms a portion of a servo track writer (STW) assembly used to write servo data to a storage medium, and wherein the search window is used by the STW assembly to determine a relative location of said written servo data.

18. The apparatus of claim 17, wherein the STW assembly is configured to write a plurality of adjacent spiral servo patterns to the storage medium each extending substantially between an outermost diameter (OD) to an innermost diameter (ID) of the medium, and wherein the control block uses the adapted search window at the conclusion of the writing of each said spiral servo pattern to locate the reference pattern as a circumferentially extending bit sequence adjacent a selected one of the OD and ID of the medium.

19. The method of claim 1, in which the search window is characterized as a read gate signal which is continuously asserted during said detection of the plurality of successive bits in the reference pattern.

20. The method of claim 1, in which the reference pattern is characterized as a circumferentially extending 2T pattern at a selected radius on a storage medium.

21. The method of claim 20, further comprising accumulating the plurality of successive bits detected during the search window to provide a total accumulated count, and using the total accumulated count to identify the selected radius.

* * * * *